March 1, 1966 B. R. BOYMEL ETAL 3,238,457

SIGNAL TO NOISE RATIO MONITOR

Filed May 8, 1963

3 Sheets-Sheet 1

INVENTOR
Morris G. Watson, Jr.
Bernard R. Boymel

BY Hurvitz & Rose
ATTORNEY

INVENTOR
Morris G. Watson, Jr.
Bernard R. Boymel

BY Hurvitz & Rose

ATTORNEY

March 1, 1966 B. R. BOYMEL ETAL 3,238,457

SIGNAL TO NOISE RATIO MONITOR

Filed May 8, 1963

3 Sheets-Sheet 3

INVENTOR
Morris G. Watson, Jr.
Bernard R. Boymel

BY Hurwitz & Rose

ATTORNEYS 3,238,457
SIGNAL TO NOISE RATIO MONITOR
Bernard R. Boymel, Washington, D.C., and Morris G. Watson, Jr., Vienna, Va., assignors to Melpar, Inc., Falls Church, Va., a corporation of Delaware
Filed May 8, 1963, Ser. No. 278,912
8 Claims. (Cl. 325—67)

Figure 1:
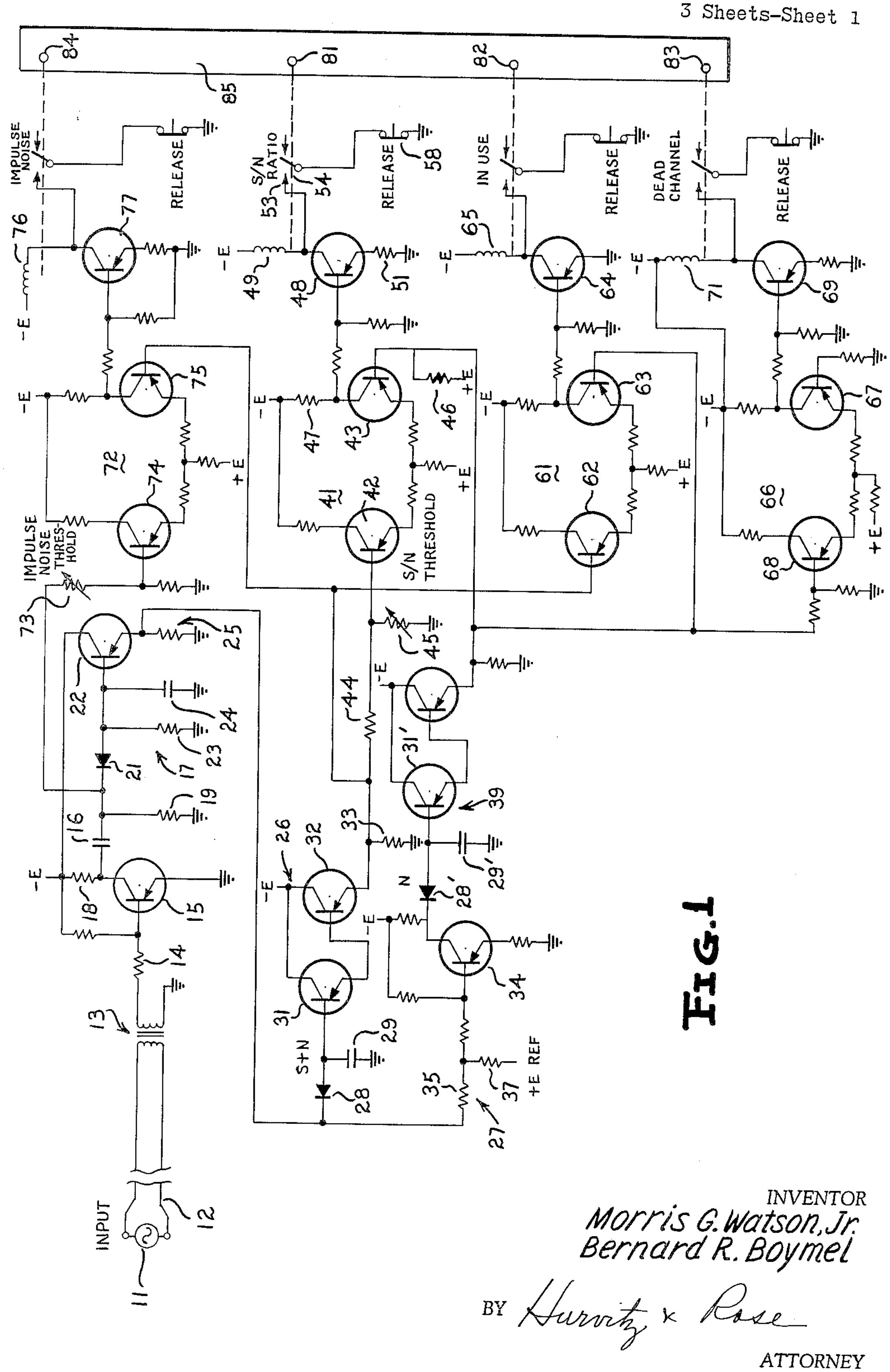

The present invention relates generally to systems for monitoring the transmission quality of channels carrying audio signal in the presence of noise and more particularly to a system for deriving noise and signal to noise ratio information from the envelope of the received audio signal.

The important parameter for determination of voice channel quality and at the same time one of the most elusive quantities to measure is signal to noise ratio. For an equipment to analyze signal to noise ratio, it must measure, deduce or approximate the signal power or voice energy within the channel being monitored and also derive a value for noise power. If it is assumed, as is proper, that there is no control over the timing of the received audio because of the unpredictable variation in the frequencies and amplitudes of the components of the signal during any two given time intervals and the further unpredictable intervals between successive transmissions of signal, the problem becomes apparent. In the case of a voice channel or channels, for example, the incoming speech wave varies in accordance with several factors, including the rapidity with which the original speech is spoken, the occurrence and length of intervals of interruptions in the speech, these exemplary factors being dependent upon the particular idiosyncracies of the speaker, i.e. the person whose voice is being transmitted. Proper monitoring of the channel to determine its transmission quality does not admit of the placing of no constraints on the speaker so that the system must be responsive to the above mention variations and be able to adapt to them. However, one constraint which may be placed on the transmission in the case of speech waves is the arbitrary setting of a maximum time interval during which it may be assumed that the speech wave is merely interrupted, but not concluded. If this interval is properly selected by a sufficient number of observations of typical transmission, at least one additional factor of quality may be determined by the monitoring system, as will presently be explained.

According to the present invention channel noise voltage level and signal to noise ratio measursements are derived by detecting the crests (i.e. peaks or maximums) and troughs (i.e. valleys or minimums) in the wave envelope described by the locus of peaks of the audio signal (for example, a speech wave), relative to a reference or datum point existing at the noise level, at the receiver or analyzing station. The maximum and minimum vales of the envelope, respectively indicative of maximum speech amplitude and noise level, are detected and compared to measure signal to noise ratio. The minimum level of the envelope is indicative of system noise level because, at such times, the speaker is silent so the only voltages generated in the system are due to noise since intelligence signal level is either buried in the noise or is zero.

To detect maximum amplitude of the received signal, the output of the device utilized for envelop detection is coupled to a peak detector having a long time constant so relatively constant D.C. signals indicative of maximum received voice level are derived even during speaker silence periods. To provide a voltage indicating noise level, the envelope output is phase inverted relative to the envelope and the phase inverted signal is applied to a further peak reading detector, similar in time constant characteristics to the maximum amplitude detector. Thereby, the signal amplitude derived from the noise indicating detector is an inverse function of noise received, i.e. for low noise the noise indicating signal is of large value and vice versa for high noise content. Outputs of the noise and maximum signal indicating detectors are compared to obtain signal to noise ratio information.

It is also possible to determine whether a particular channel is being used by comparing the noise and signal level indicating signals by utilizing another comparator having a different firing level than the signal to noise ratio detecting comparator. If it is desired to ascertain the occurrence of a noise impulse, i.e. a noise spike having a period considerably less than random noise in the system, the input signal, prior to envelope detection, is compared with the output of the maximum amplitude detection circuit. When the undetected signal attains an amplitude greater than the maximum amplitude signal an indication is provided that a noise spike has occurred.

According to one emboidment of the invention, determination of a dead channel relies upon the finding that no noise exists in the system only when a channel is dead. In this embodiment, dead channel indication is provided when a very large signal is derived from the noise detector, indicative of no noise or an abnormally low noise level being received.

According to a further embodiment of the present invention, dead channel indications are provided by supplying a pulse modulated constant frequency signal to the transmission line by an auxiliary circuit at the transmitter when a silent voice condition of a predetermined time duration (approximately 40 seconds) is detected. When such a signal is received at the analyzing station an accurate indication that the channel being monitored is not in use is easily derived by passing the constant frequency signals through a band pass filter to a detector. Further, such a signal enables a definite indication of equipment failure to be given at the analyzer because only when there is an equipment failure will the receiver input noise be of minimum level for sufficient time periods to enable an inductor responsive to the noise detection channel.

While we are aware that U.S. Patent 2,261,951, issued on November 11, 1941 to Bloch for "Method and Means for Receiving Modulated Waves," discloses a circuit quite similar to ours the concepts of our circuit differ radically from those of the Bloch patent. In Bloch, the signal received is a modulated carrier wherein both maximum and minimum amplitudes in the received signal occur for maximum intelligence at the transmitter. The peaks and the troughs of the received, detected audio wave are detected to ascertain when a noise spike occurs in excess of the modulated wave. The Bloch system is totally inappropriate to provide a constant indication of system noise because a zero amplitude condition in the transmitted intelligence is represented by a detected wave having an amplitude other than zero, about which amplitude the detected modulation varies. In accordance with our invention the detected envelope always provides an indication of the maximum and minimum level of signal received, not of modulation index, as in Bloch.

It is accordingly an object of the present invention to provide a new and improved system for monitoring the transmission quality of channels carrying audio signals wherein measurements of noise, signal to noise ratio, utilization of apparatus, and equipment failure are derived.

It is another object of the present invention to provide a system for analyzing the noise content of an audio wave, wherein the minimum wave amplitude is detected and analyzed to ascertain noise level.

It is a further object of the present invention to provide a signal to noise ratio detector wherein maximum and minimum values of the envelope of an audio wave are utilized to provide signal and noise level indications, respectively, to ascertain signal to noise ratio.

It is a further object of the present invention to provide a new and improved system for monitoring voice transmitting channels wherein definite indications of equipment failure and in use status are provided because a signal of predetermined character is transmitted during prolonged periods of voice silence.

Figure 2:
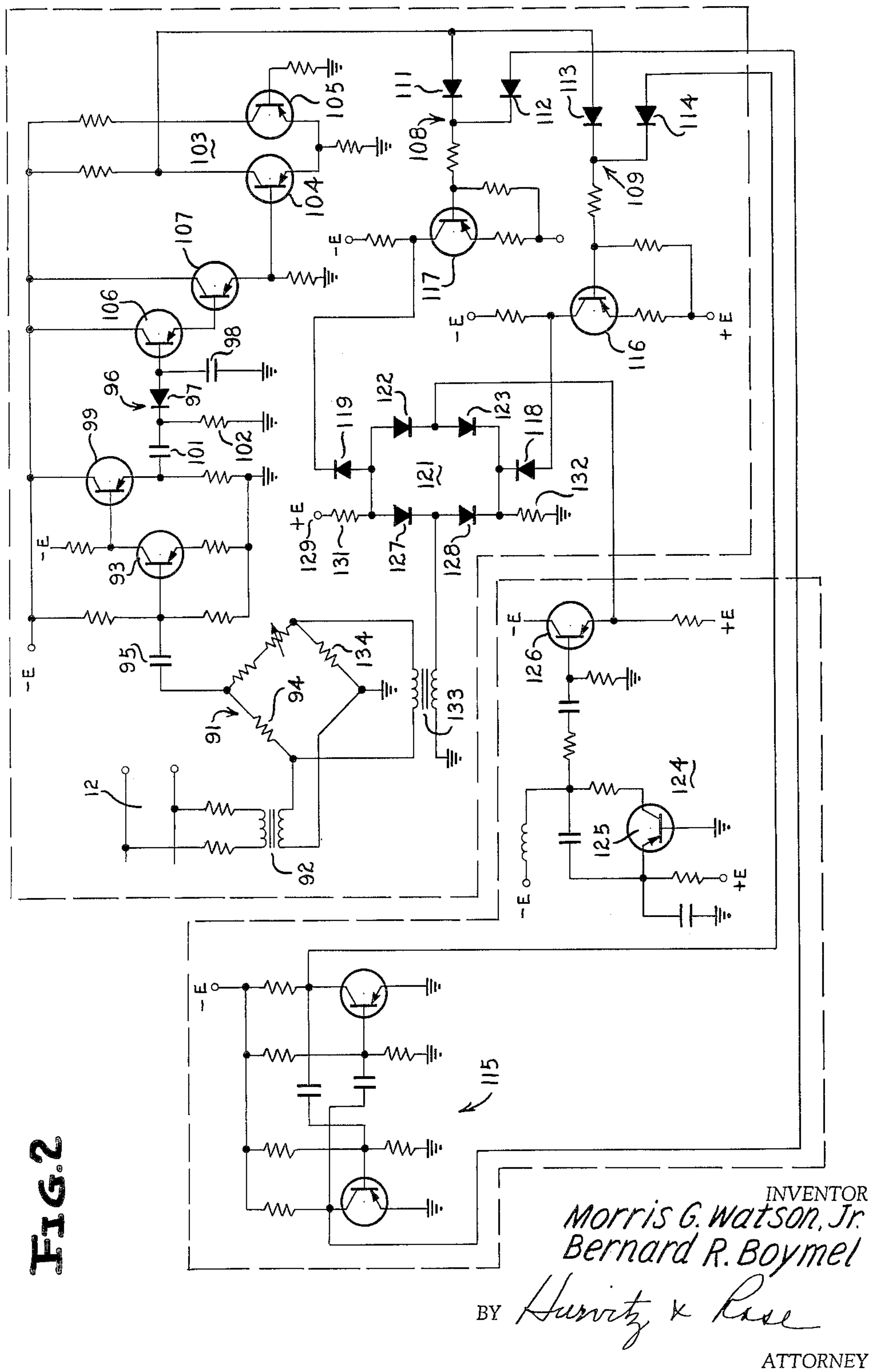
Figure 3:
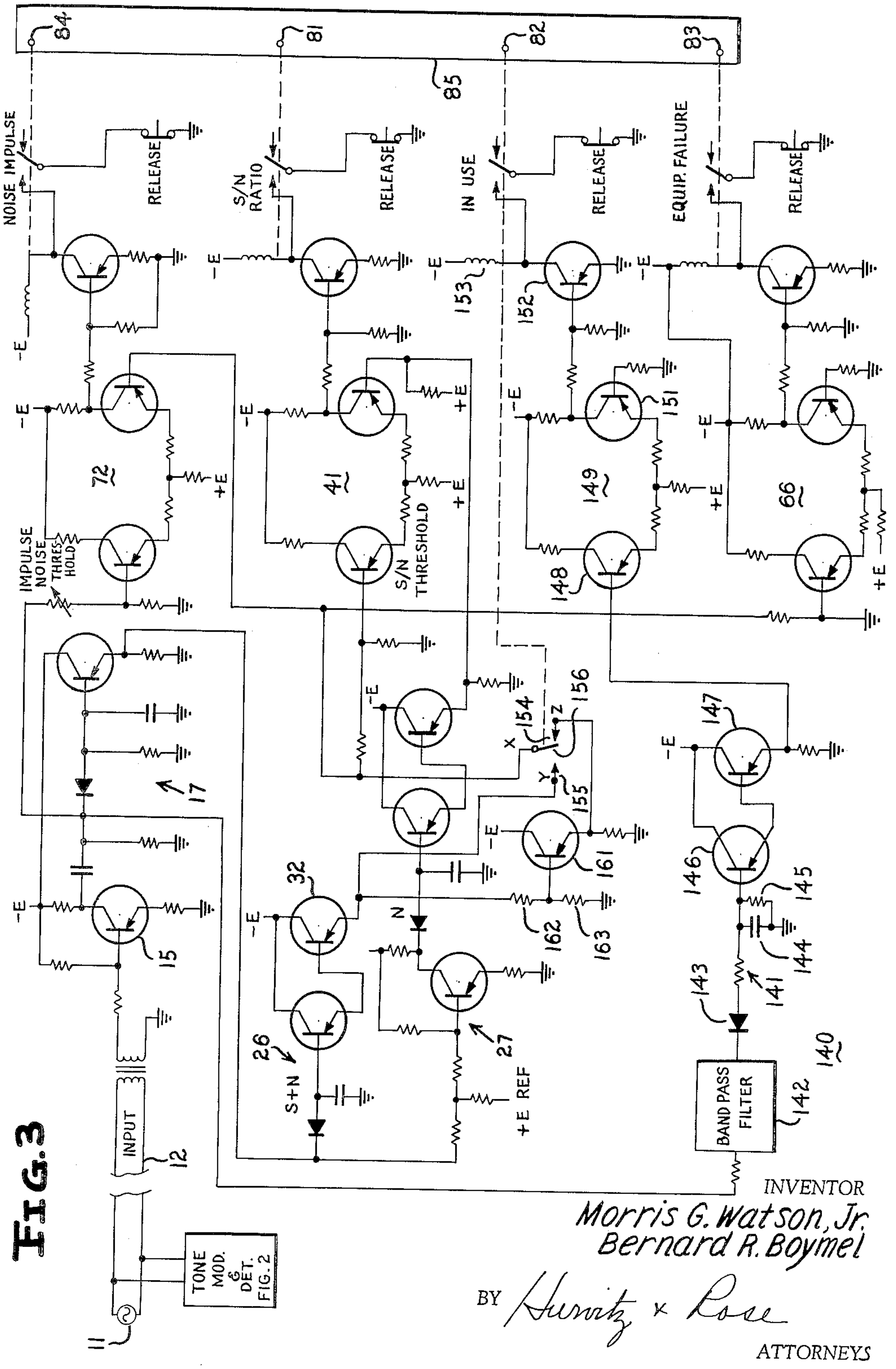

The above and still further objects, features and advantages of the present invention will become apparent upon consideration of the following detailed description of several specific embodiments thereof, especially when taken in conjunction with the accompanying drawings, wherein:

FIGURE 1 of the drawings is a schematic diagram of one embodiment of the present invention;

FIGURE 2 is a schematic diagram of a portion of the second embodiment of the present invention; and FIGURE 3 is a circuit diagram of the remainder of the second embodiment.

Reference is now made to FIGURE 1 of the drawings wherein source 11 of audio or voice signals, located at a transmitting station, applies signal to appropriate conventional transmitting equipment (not shown), the signal being subsequently received at the input of a reciving station via long line 12. To analyze the content of the signal at the receiver, line 12 is connected to the primary winding of transformer 13, the secondary of which is connected via current limiting resistor 14 to the base of inverting and amplifying transistor 15. The collector of PNP transistor 15, connected in the common emitter mode, feeds a replica of the audio signal received through coupling capacitor 16 to the input of audio envelope detector 17.

Audio envelope detector 17, responsive to the voltage developed across collector load resistances 18 and 19 of transistor 15, includes diode 21 having its cathode connected to the collector of transistor 15 via coupling capacitor 16 and its anode connected to the base of emitter follower transistor 22. Connected between the junction of diode 21 and the base of transistor 22 are the parallel combination of resistor 23 and capacitor 24. The values of resistor 23 and capacitor 24 are selected to have a time constant of approximately six to ten milliseconds so that a replica of the received audio envelope is supplied to the base of transistor 22.

The envelope signal generated across the emitter load resistance 25 of transistor 22 is coupled in parallel to signal plus noise channel 26 and noise channel 27.

Signal plus noise channel 26 includes diode 28, having its cathode connected to the emitter of transistor 22 and its cathode connected to storage capacitor 29. The signal developed across capacitor 29 between the base of transistor 31 and ground is coupled via the Darlington circuit comprising transistors 31 and 32 to load resistance 33. Signal plus noise channel 26 including diode 28, capacitor 29 and the Darlington circuit thus comprises a network for deriving a D.C. voltage indicative of the peak value of the audio envelope detected by detector 17. The detector 26 time constant is approximately four to six seconds. Hence, the voltage across resistance 33 is maintained at sufficiently large values for relatively long intervals (e.g. 40 seconds) between voice occurrences to provide indications to the output circuits, discussed infra, that the line being monitored is in use. If the line monitored transmits no voice signal to the receiver for 40 seconds, the voltage across resistor 33 drops to a low enough value to provide an indication that the line is not in use. It has been found that silent periods in excess of 40 seconds usually occur only when a line is not in use as a practical matter, hence the 40 second design criterion.

Noise channel 27, driven in parallel with signal plus noise channel 26, comprises an inverting transistor 34 having its base connected to the emitter of transistor 22 via the T-biasing network comprising resistors 35, 36 and 37. One end of resistor 37 is connected to a positive D.C. bias that has a tendency to drive transistor 34 into cutoff. Load resistor 38 for the collector of transistor 34 is connected to the input of detecting circuit 39 that is essentially identical with the detector in signal plus noise channel 26. Since the input of detector 39 is driven by a signal 180° out of phase with the input of channel 26, its output is a D.C. signal indicative of the lowest voltage level in the signal envelope received. Since the lowest level occurs during voice silent periods, when only noise is present in the received signal, the output of peak detector 39 is indicative of the noise level of the received signal.

In operation, the troughs or minimum voltages between the voice portions of the signal at emitter of transistor 22 are inverted in phase by transistor 34 so that a large negative voltage is applied to the cathode of detecting diode 28′ in detector 39 when the voice signal is silent. Hence, a large negative voltage is applied across capacitor 29′ to indicate the presence of little noise in the received signal. As the noise in the received signal increases, the minimum magnitude of the voltage coupled to the base of transistor 34 between voice intervals increases, causing an amplitude reduction of the negative voltage applied to the cathode of diode 28′. In consequence, the voltage developed at the base of transistor 31′ is reduced as the noise content in the received signal increases. It is thus seen that the magnitude of the detected signal in the noise channel is an inverse function of the noise content of the received signal.

Signal plus noise channel 26 operates in substantially the same manner as described for noise channel 27, except that its output is responsive to the largest amplitude signals rather than the lowest.

To determine when the signal to noise ratio exceeds a predetermined level, the outputs of channels 26 and 27 are supplied to comparison circuit 41. Comparator 41 comprises a differential amplifier including common emitter transistors 42 and 43 having their bases driven by the output signals of channels 26 and 27, respectively. To set the relative signal to noise level at which comparator 41 produces an output to trigger an indicator, described infra, the attenuating network comprising resistor 44, connected between the emitter of transistor 32 and the base of transistor 42, and variable resistance 45 is provided. For the same purpose, a positive bias is connected via resistance 46 to the base of transistor 43, responsive to noise channel 27.

The output of comparator 41, developed across load resistor 47 for the collector of transistor 43, is applied to the base of trigger transistor 48. The collector of transistor 48 is connected through relay coil 49 to a negative bias supply while the emitter is connected through a current limiting resistor 51 to ground. When transistor 48 is triggered into conduction by the voltage at the collector of transistor 43 relay 49 is activated. Activation of relay 49 results in closure of contacts 53 and 54 to short circuit the collector of transistor 48 through contacts 55 and 56 of manually operated release switch 58. When the system operator has noticed that a signal to noise ratio indication has been given by a lamp, in a manner discussed infra, and desires to reactivate the signal to noise ratio detecting channel, manual switch 58 is depressed to open circuit the shunt across the collector of transistor 48. This causes winding 49 to be deactivated if system signal to noise ratio is at a tolerable level.

Under low noise conditions the signal amplitude applied to the base of transistor 43 is considerably greater than that applied to transistor 42 because of the attenuating effects of resistors 44 and 45. In consequence, there is considerable current flow through transistor 43 and the collector thereof is driven to a relatively low amplitude, almost to ground. This results in insufficient bias being applied to the base of transistor 48 to trigger relay 49. As system noise increases the voltage magnitude coupled to the base of transistor 43 decreases, while the amplitude of the signal coupled to the base of the transistor 42 remains relatively constant because signal level is generally much greater than noise. In consequence, the collector of transistor 43 is driven negatively to apply greater base bias to transistor 48. When the amplitude of the signals coupled to the bases of transistors 42 and 43 are equal, indicative of zero dbm noise level, the base bias of transistor 48 is sufficiently great to activate relay 49.

To provide an indication that the channel being monitored is or is not in use, comparator 61, similar to comparator 41, is employed. Transistors 62 and 63 of comparator 61, however, are directly responsive to the output signals of signal plus noise and noise channels 26 and 27, respectively. In consequence, trigger transistor 64, responsive to the collector voltage of transistor 63, draws sufficient current to activate relay 65 only when the signal plus noise channel output is 3 dbm above the noise channel output. Of course it is to be understood that the criteria for triggering relays 49 and 65 may be any other suitable relative values for the output signals of channels 26 and 27.

To provide an indication that the channel being monitored is dead, i.e. that no signal is being received, comparator 66 compares the level of the noise signal derived from channel 27 with a reference voltage. The reference voltage is applied to the base of transistor 67 while the noise signal is applied to the base of transistor 68. If the channel being monitored is dead, there is no noise coupled to the primary winding of transformer 13 so the output signal of channel 27 has a large negative amplitude. This signal causes transistor 68 to conduct heavily. The heavy conduction of transistor 68 is reflected through the emitter collector path of transistor 67 to forward bias the base emitter junction of trigger transistor 69 and activate relay 71.

To provide an indication that a noise impulse has occurred, the signal in its original form, prior to envelope detection, is compared with the output signal of signal plus noise channel 26 in comparator 72. The signal at the junction of capacitor 16 and diode 21 is coupled through variable resistance 73 to the base of transistor 74 while the emitter of transistor 32 is connected to the base of transistor 75 to achieve this result. The collector of transistor 75 drives impulse indicating relay 76 through amplifying and inverting trigger transistor 77. When a noise impulse in the received signal occurs, noise impulse being distinguished from a constant noisy condition by the relative time durations thereof, the base of transistor 74 is forward biased relative to the base of transistor 75. As a result, a large negative voltage is applied to the base of transistor 77 to render it into a conducting condition whereby relay 76 is activated.

Each of the relay indicating circuits 65, 71 and 76 includes a self-holding circuit and a manually operated release button similar to that described supra in connection with relay coil 49. Since these circuits are all identical, the description for relay 49 suffices for all.

Each of the relay coils 49, 65, 71 and 76 drives a separate pair of relay contacts that are selectively connected to lamp indicators 81–84, respectively, in relay matrix 85. Connections are established in matrix 85 in a known manner whereby activation of "signal to noise ratio" indicating lamp 81 is precluded when "not in use" lamp 82 is activated. This is necessary to prevent the person monitoring the voice channel from making erroneous notations regarding the cause of malfunction since a "signal to noise ratio" indication is always provided when a "not in use" indication is generated. Similar connections exist between indicator 83 and indicators 81, 82 and 84, to prevent the activation of the latter when the former is lit. This is to preclude the erroneous energization of the "impulse noise," "signal to noise ratio" and "in use" indicators when a signal is received indicating that the channel comprising transmission line 12 is dead.

Reference is now made to FIGURE 2 of the drawings, a circuit diagram of the apparatus utilized at the transmitter for selectively transmitting audio tones of predetermined frequency modulated by long duration pulses when the voice channel is silent for a substantial time duration, e.g. 40 seconds. When the voice channel is in use the circuitry of FIGURE 2 presents a relatively large impedance, 6,000 ohms, across the 600 ohm transmission line 12 so that loading of the line is precluded to a great extent.

To alternately feed a signal from the tone modulator and control unit of FIGURE 2 to the line while monitoring the voltage variations across the line in response to unmodulated voice source 11. Wheatstone bridge 91 is provided. One arm of Wheatstone bridge 91 is coupled across line 12 by its connection to the secondary winding of transformer 92, the primary of which is directly connected across line 12.

To derive a voltage indicative of signal variations across line 12, one end of the secondary winding of transformer 92 is connected to ground while the other end thereof is connected to the base of amplifying transistor 93 via resistance 94 in bridge 91 and coupling capacitor 95. The output signal of transistor 93 drives detector 96, comprising diode 97 and capacitor 98, via emitter follower, isolating transistor 99.

The output of emitter follower 99 is coupled to detector 96 via a phase advance circuit comprising capacitor 101 and resistor 102 to insure a rapid build up on capacitor 98 in response to sudden negative excursions at the emitter of transistor 99. Since negative excursions at the emitter of transistor 99 are indicative of a sudden positive voltage across line 12, hence of a voice condition in signal 11, it is important that a phase advance circuit be utilized.

The time constant of detector 96 is approximately four to six seconds so that a substantial signal is developed across capacitor 98 for time periods of up to 40 seconds between voice occurrences in signal 11. The output of detector 96 is coupled to comparator 103 including emitter coupled differential transistors 104 and 105 via Darlington circuit comprising transistors 106 and 107.

When a voice signal appears or has appeared across line 12 within the last 40 seconds, the voltage across capacitor 98 is sufficiently large to cause the collector voltage of transistor 104 to be small enough to close gates 108 and 109 comprising rectifiers 111–114. When, however, there is no voice signal on line 12 for a 40 second interval, indicative of the line or channel not in use, the base of transistor 104 is back biased to cut off and so a large negative voltage is coupled from the transistor collector to gates 108 and 109.

Gates 108 and 109, in addition to being responsive to the silent indicating voltage output from comparator 103, are responsive to the oppositely phased outputs of free running multivibrator 115. Multivibrator 115 generates square wave voltages having a period in the range of one-half to three seconds, the period being selected to insure proper operation of channels 26 and 27 in the receiver. When gates 108 and 109 are open by the collector voltage of transistor 104, amplifying transistors 116 and 117, responsive to the outputs of gates 108 and 109, respectively, are alternately driven into a forward biased condition by the opposite polarity outputs of multivibrator 115. The output signals of transistors 116 and 117 are coupled to the anode and cathode of diodes 118 and 119, respectively, in six diode gating bridge 121.

The junction between the anode and cathode of diodes 122 and 123 in bridge 121 is responsive to an audio frequency sine wave voltage generated by oscillator 124 comprising transistors 125 and 126. The output of bridge 121 is developed at the junction formed by the cathode and anode of diodes 127 and 128, connected in series circuit between the positive bias source at terminal 129 by resistors 131 and 132. The bridge output terminal is connected across the primary winding of transformer 133, the secondary of which is connected across a winding of transformer 92 and resistance arm 134 of bridge 91.

When gates 108 and 109 are open to pass the square wave outputs of multivibrator 115 to bridge 121 the sine wave form oscillator 124 is coupled to transformer 133 through the bridge during alternate half cycles of multivibrator 115. When the multivibrator cuts off transistor 116 and causes transistor 117 to conduct, a large negative voltage is applied to the anode of diode 118 while a voltage having approximately zero value is coupled to the cathode of diode 119. In consequence, positive excursions of the sinusoidal voltage deriving from transistor 126 are coupled through forward biased diodes 123 and 128 while the negative excursions are coupled through the low impedance path comprising diodes 122 and 127. In the next half cycle of multivibrator 115, however, a large negative bias is applied to the cathode of diode 119 while the bias supplied to the anode of diode 118 is substantially zero. As a result, a low impedance path exists through diodes 118 and 119 to shunt the oscillations generated at the emitter of transistor 126 and preclude their coupling to the primary winding of transformer 133. When a voice signal has occurred on line 12 within the last 40 seconds so that transistors 116 and 117 are both back biased and negative voltages are applied to the anode and cathode of diodes 118 and 119, bridge 121 is cut off to preclude coupling of the sinusoidal voltage generated by oscillator 124 to the primary of transformer 133.

It is thus seen that audio frequency oscillations having an on and off type envelope with a periodicity of one half to three seconds appear across line 12 whenever a prolonged silent period of approximately 40 seconds is detected at the transmitter. This signal is utilized to provide a more positive "in use" or "not in use" indication for a particular channel at the receiver monitoring the content of the signal propagated along line 12.

Reference is now made to FIGURE 3 of the drawings, a modified version of the analysis unit of FIGURE 1 adapted to be utilized with the tone modulator and control circuit of FIGURE 2. In the circuit of FIGURE 3, envelope detector 17, signal plus noise ratio channel 26 and noise channel 27 are substantially as indicated in FIGURE 1. Also, impulse noise comparator 72 and signal to noise comparator 41 are substantially identical with the similar circuits of FIGURE 1.

In the circuit of FIGURE 3, comparator 66 may properly be termed an equipment failure determining device because an input signal is supplied to the receiver from the transmitter and tone modulator and detector circuit of FIGURE 2 at all times when the system is operating. This is because pulse modulated sinusoidal waves of predetermined frequency are generated by the apparatus of FIGURE 2 and transmitted on line 12 only during periods of prolonged voice silence. Hence, the only time a maximum amplitude output signal from channel 27 occurs with the receiver of FIGURE 3 is in response to an equipment failure.

To determine "in use" condition, the apparatus of FIGURE 3 includes a further channel 140, responsive only to the sinusoidal oscillations generated by oscillator 124. Channel 140 is connected to the collector of transistor 15 via bandpass filter 142, having a mid range equal to the frequency of the oscillations deriving from oscillator 124. The output of bandpass filter 142 is coupled to detector 141 including diode 143, the anode of which is connected to the parallel combination of capacitor 144 and resistor 145. The time constant of the detector 141 is such that a significant voltage exists at the base of transistor 146 only while gates 108 and 109, FIGURE 2, are open. Only in periods of prolonged voice silence when gates 108 and 109 are open is transistor 146 forward biased to develop a relatively large potential at the emitter of transistor 147, connected in a Darlington circuit with transistor 146. Since voice signals do not occur in the bandpass of filter 142 for periods comparable with the pulse modulation period of multivibrator 115, there is virtually zero probability that significant voltage is developed at the output of detector 141 except during prolonged silent period when the center frequency of filter is received for a relatively long time.

Under in use or voice conditions transistor 148 is back biased, so the collector of transistor 151 is maintained at a relatively low magnitude, thereby preventing transistor 152 from conducting sufficient current to activate relay coil 153. When a silent period in excess of 40 seconds occurs, however, the base of transistor 152 is sufficiently forward biased by the signal from oscillator 124 to activate relay coil 153 causing indicator 82 to be activated. In addition, relay coil 153 selectively activates armature 154 to engage contacts 155 and 156.

To provide signal to noise ratio and equipment failure indications under both the voiced and silent conditions of transmission, it is necessary to vary the gain of signal plus noise channel 26 because the voice signal is transmitted at zero dbm while the signal deriving from bridge 91, FIGURE 2, is transmitted at a 15 dbm level. To provide the variable attenuation necessary for the two conditions, emitter follower transistor 161 has its base connected to the emitter of transistor 32 via the voltage divider comprising resistances 162 and 163. When a voiced signal is being received and contact 156 engages armature 154 of relay 153 the emitter of transistor 161, terminal Z, is connected to terminal X, the output of signal plus noise channel 26. This introduces the required attenuation level when the voiced signal is being received in comparison with a silent signal. When, however, a low level, silent indicating signal from oscillator 124 is being received whereby armature 154 engages 155 and the X and Y contacts are connected, the emitter of transistor 32 is connected directly to the X output terminal of channel 26 to shunt the attenuation introduced by the circuitry associated with emitter follower 161.

While we have described and illustrated several specific embodiments of our invention, it will be clear that variations of the details of construction which are specifically illustrated and described may be resorted to without departing from the true spirit and scope of the invention as defined in the appended claims.

We claim:

1. Apparatus for monitoring the transmission quality of a signal channel carrying audio signal in the presence of noise, said apparatus comprising means responsive to said signal for deriving therefrom a wave representative of the envelope of said signal, means responsive to said wave for detecting the peak amplitude thereof and for generating a voltage having a level representative of said peak amplitude, said peak amplitude being proportional to maximum signal-plus-noise level on said channel, further means responsive to said wave for phase inversion thereof, means responsive to the inverted wave for detecting the peak amplitude thereof and for generating a voltage having a level representative of the last named peak amplitude, said last named peak amplitude being proportional to the noise level on said channel, and means responsive to the first named and last named voltages for deriving therefrom an indication of the signal-to-noise ratio of said channel.

2. The combination according to claim 1 wherein said means for deriving said wave has a signal translation time constant which is long compared to the time variation of said audio signal.

3. The combination according to claim 1 further including means responsive to said last named voltage and to a preselected reference level for providing an output voltage when the level of said last named voltage exceeds said reference level, whereby to indicate an abnormally low noise level representative of a transmission failure on said channel.

4. The combination according to claim 1 further including means responsive to the voltage level of the audio signal on said channel and to the level of said first named voltage for indicating the presence of impulse noise on said channel when said audio signal voltage level exceeds said first named voltage level by a predetermined amount.

5. The combination according to claim 1 wherein each of said means for detecting peak amplitude has a signal translation time constant which is long compared to the interval between peaks of the audio signal.

6. The combination according to claim 5 including further means responsive to said first and last named voltages for deriving therefrom an indication of audio signal interruption exceeding a predetermined time interval, said predetermined time interval being controlled by the time constant of each of said means for detecting peak amplitude, whereby to provide an indication when said channel is idle.

7. The combination according to claim 5 wherein said means for deriving an indication of signal-to-noise ratio comprises a comparison network, including means responsive to said first named voltage to provide an output voltage proportional thereto when said first named voltage exceeds a pre-selected threshold level, indicator means, and means for combining said output voltage and said last named voltage to actuate said indicator means.

8. The combination according to claim 7 wherein is included means for adjusting said threshold level.

References Cited by the Examiner

UNITED STATES PATENTS

| | | | |
|---|---|---|---|
| 2,261,951 | 11/1941 | Bloch | 325—474 |
| 2,632,100 | 3/1953 | Todd | 325—65 |
| 2,991,358 | 7/1961 | Wilcox | 324—77 |
| 2,996,613 | 8/1961 | Glomb | 328—165 |
| 3,061,830 | 10/1962 | Gray et al. | 325—480 |

DAVID G. REDINBAUGH, *Primary Examiner.*

B. V. SAFOUREK, *Assistant Examiner.*